Oct. 11, 1938.   K. RABE   2,132,759
WHEEL SUPPORTING MEANS
Filed May 7, 1936
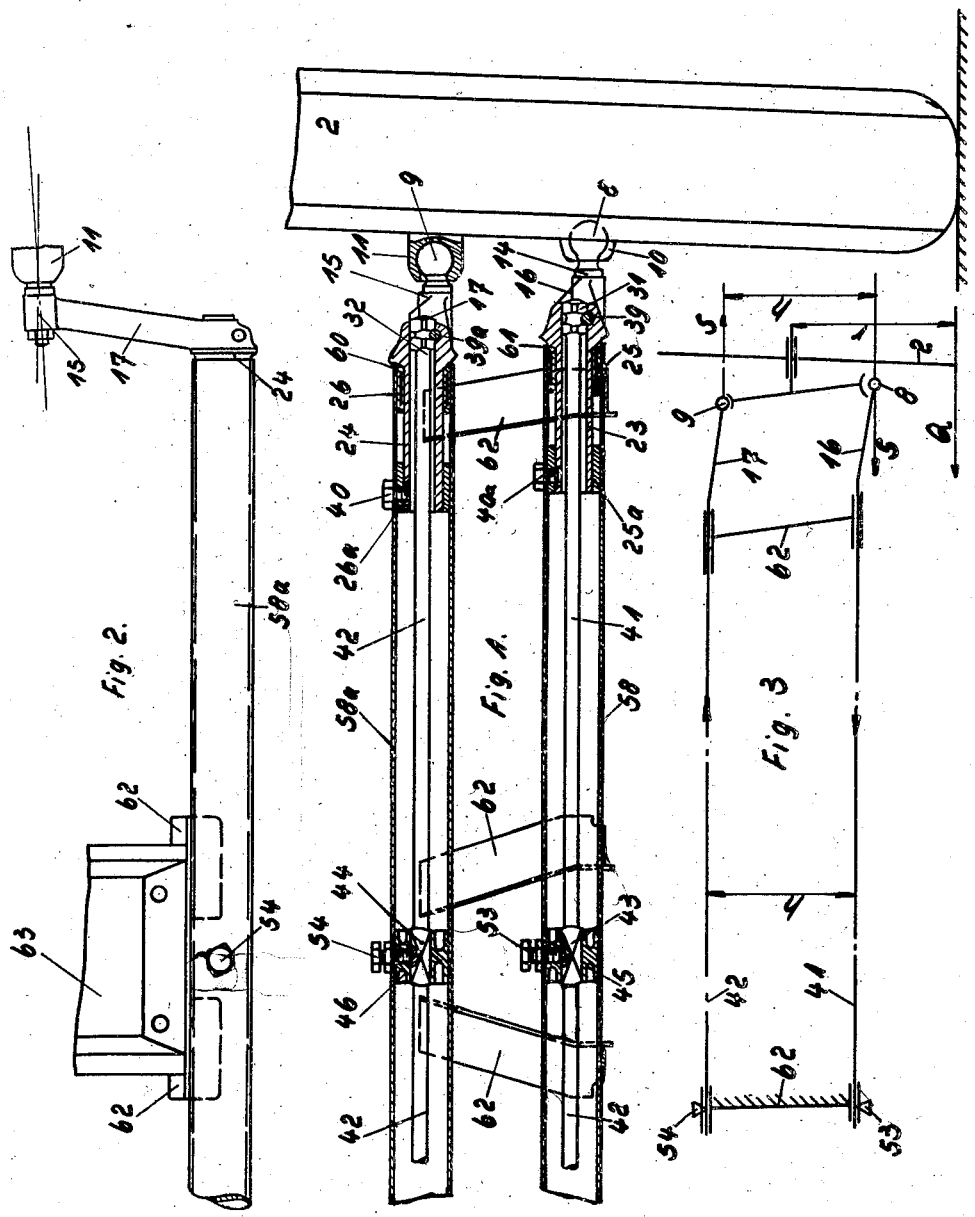
Karl Rabe
Inventor
by A. A. Llicke
Attorney Patented Oct. 11, 1938

2,132,759

UNITED STATES PATENT OFFICE 2,132,759

WHEEL SUPPORTING MEANS

Karl Rabe, Stuttgart, Germany

Application May 7, 1936, Serial No. 78,315
In Germany May 18, 1935

21 Claims. (Cl. 267—57)

This invention relates to wheel supporting means and in particular to a springing mechanism for wheels of motor vehicles.

An object of this invention is the provision of wheel supporting means embodying means for cushioning transverse shocks applied to the wheels.

Another object of this invention is the provision of wheel supporting means including horizontal springing means so that transverse forces applied to the wheels, as for example, when going around a curve or hitting a curb, will be absorbed.

A further object of this invention is the provision of horizontal springing means in conjunction with vertical springing means in a wheel supporting mechanism.

A more particular object of this invention is the provision of wheel supporting means which combines horizontal springing means and vertical springing means in such a manner that the function of one springing means will not interfere with the function of the other.

A more particular object of this invention is the provision of wheel supporting means which combines horizontal springing means and vertical springing means in such a manner that the same spring means will serve the purpose of both vertical and horizontal springing.

Other objects will appear from the following description of an illustrative embodiment of the invention taken together with the attached drawing wherein:

Fig. 1 is an approximately vertical cross-sectional view of a wheel suspension taken substantially at right angles to the direction of travel;

Fig. 2 is a corresponding elevation; and

Fig. 3 is a diagram showing the application of transverse forces.

The wheel 2 is carried by means 8 and 9 which are preferably universal joints such as the spherical joints shown, and thus provide not only for swinging movement but also for steering movement. As shown, the carrying arms are formed with spherical ends 14 and 15 which rest in sockets 10 and 11 of the steering knuckle. The arms 16 and 17 are attached to the parallel superposed transverse tubes 58 and 58a as by means of the trunnions 23, 24. The trunnions 23, 24 are shown journaled within said tubes exteriorly on needle bearings 25, 26 and inwardly in plain bearings 25a, 26a. The trunnions 23, 24 are connected with torsion rods 41, 42 which, on the wheel end are provided with square or other non-cylindrical ends 31, 32 to provide against relative rotation, and with suitable means such as pins 39, 39a to provide against relative longitudinal shifting. The torsion rods 41 and 42 are shown extending beyond their abutments 45, 46 in the transverse tubes 58, 58a to the trunnions of the opposite wheel, whereby one torsion rod serves for springing two wheels. As shown, the rods are fixed against rotation at the center of the car as by means of square portions 43, 44, and against longitudinal shifting as by means of the screws 53, 54. Axially the trunnions 23, 24 are resiliently supported relative to the transverse tubes 58, 58a through the spring rods 41, 42. Near the inner ends of the trunnions 23, 24, said screws 39, 39a are provided with sufficient play so that the necessary radial and axial movement of the trunnion is not prevented. The ends of the cross tubes 58 and 58a are shown sealed by means of rubber rings 60 and 61. The transverse tubes 58 and 58a are combined into a single cross member by means of braces 62, which may be attached by means of flanges to the longitudinal frame member 63.

If a transverse force Q is applied to the wheel, as shown in Fig. 3, a canting moment $Q \times r$ results, if $r$ is taken as the effective radius of the wheel. This canting moment works upon the arms 16, 17 in the form of a force couple $S \times h$, where $h$ represents the vertical distance between the arms 23 and 24. Therefore a tension S is applied to the upper trunnion 24, and a compression S is applied to the lower trunnion 23. Since the trunnions 23 and 24 are controlled axially only by the torsion rods 41 and 42, the forces S must be taken up by said rods; the upper torsion rod 42 is therefore subjected to a tension and the lower rod 41 to compression.

The trunnions 23 and 24, and therefore the wheel itself, is accordingly provided with axial springing whereby the transverse force Q is resiliently taken up. At the same time, the normal position of the wheel is practically unaltered, and the usual vertical springing means will function without interference.

If a torsion rod breaks, the trunnions 23 and 24 remain in position, since the set screws 40 and 40a act as abutments and limit the axial movement of the trunnions 23 and 24. Oscillation of the trunnions 23 and 24 is limited by the usual wheel abutments. The set screws 40 and 40a may be utilized as wheel abutments. The set screws 53 and 54 do not have to transmit the entire force S, since the squares 43 and 44 are under considerable friction due to the weight of both sides of the car. By removal of the screws 40, 40a and 53, 54, and also the pins 39, 39a, torsion rods 41 and 42 may be easily disassembled.

The invention is not limited to the example shown. Every type of torsion rod may be used as, for example, helical springs the transverse reaction of which can be selected independently of its torsional reaction. It is also immaterial how the trunnions of the arms are attached to the torsion rods, or how the latter are attached to the frame.

The word "frame" as herein used is not to be understood as limited to such devices when formed separate from the body or coachwork of the vehicle, but as including such devices when forming a part of or intimately interconnected with said body or coachwork of the vehicle.

While I have herein shown and described only certain embodiments of certain features of my present invention, it is to be understood that they are to be regarded merely as illustrative and that I do not intend to limit myself thereto except as may be required by the following claims:

I claim:

1. In a wheel support, in combination, a frame, a wheel, means for supporting said wheel relative to said frame, and torsion bar means interconnecting said wheel and frame and extending transversely of said frame and springing said wheel for transverse movement relative to said frame, said torsion bar means being the sole means for so springing said wheel.

2. In a wheel support, in combination, a frame, a wheel, means for supporting said wheel relative to said frame, and torsion bar means interconnecting said wheel and frame and extending transversely of said frame for springing said wheel for both vertical and transverse movement relative to said frame, said torsion bar means being the sole means for resiliently resisting transverse movement of the wheel.

3. In a wheel support, in combination, a frame comprising a pair of superposed transverse tubular members, wheel supporting arms so journaled to the ends of said tubular members as to permit of limited axial movement, springs in said members each having one of its ends fixed to an abutment on the frame and the other end fixed to one of said wheel supporting arms.

4. In a wheel support, in combination, a frame comprising a transverse tubular member, a wheel supporting arm so journaled within the end of said tubular member as to permit of limited axial movement, a spring housed in said tubular member having one of its ends fixed to an abutment on the frame and the other end fixed to said wheel supporting arm against movement in all directions.

5. In a wheel springing mechanism for vehicles having a frame, in combination, a wheel, and torsion bar spring means extending transversely of said frame for supporting said wheel relative to said frame, said wheel, frame, and torsion bar means forming an interconnected parallelogram, whereby said wheel is sprung for transverse movement relative to said frame, said torsion bar spring means being the sole means for so springing said wheel.

6. The combination according to claim 5 including means for preventing relative rotation between said spring means and said frame.

7. The combination according to claim 5 including means for preventing relative longitudinal movement between a portion of said spring means and said frame.

8. The combination according to claim 5 including means for preventing both relative rotation and longitudinal movement between a portion of said spring means and said frame.

9. In a wheel supporting means for vehicles having a frame, the combination of a pair of superimposed tubular frame members, a wheel, means within each of said members for journaling said wheel for vertical movement, means permitting a limited amount of axial movement of said journaling means within said members, and spring means attached at one end to said frame and at the other end to said journaling means, whereby said wheel is sprung for both vertical and transverse movement.

10. In a springing means for the wheels of a vehicle having a frame, in combination, a wheel, and a pair of vertically spaced torsion bars each connected at corresponding ends to said frame and at their opposite ends to said wheel, each of said torsion bars lying in a vertical plane intersecting a vertical longitudinal plane of said vehicle, and constituting the sole torsional springing means for said vehicle.

11. The combination according to claim 10 in which said torsion bars are connected to said wheels by means journaled to said frame.

12. The combination according to claim 3 in which said spring means is a torsion bar.

13. The combination according to claim 4 in which said spring means is a torsion bar.

14. The combination according to claim 9 in which said spring means is a torsion bar.

15. In a wheel support for a vehicle, in combination, a frame including a pair of vertically spaced transverse tubular members, a wheel, means journaled within each of said members, and connected to said wheel for supporting said wheel for generally vertical movement relative to said frame, and spring means interconnecting said journaling means and said frame for springing said vehicle against both vertical and transverse movement relative to said frame.

16. The combination according to claim 15 in which said spring means is a torsion bar.

17. In a vehicle having a frame including a pair of vertically spaced tubular members, a wheel, a pair of linkage means connected to said wheel and having trunnions, bearing means within said tubular members for journaling said trunnions to said frame, means for permitting a limited axial movement of said trunnions within said tubular members, and spring means interconnecting said trunnions and said frame.

18. The combination according to claim 17 in which said spring means are torsion bars.

19. The combination according to claim 17 in which said spring means are torsion bars connected to one end at the center of said frame and at the other end to said trunnions.

20. The combination according to claim 9 in which said spring means comprises torsion bars one within each of said tubular frame members.

21. The combination according to claim 15 in which said spring means comprises torsion bars one within each of said transverse tubular members.

KARL RABE.